(12) United States Patent
Huang et al.

(10) Patent No.: US 6,249,430 B1
(45) Date of Patent: Jun. 19, 2001

(54) SUPPORT FOR A DATA STORAGE DEVICE

(75) Inventors: Shiu-Mei Huang, Taipei; Yuan-Chi Chiang, Tao-Yuan Hsien, both of (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/379,726

(22) Filed: Aug. 24, 1999

(51) Int. Cl.[7] ........................................... G06F 1/16
(52) U.S. Cl. .................. 361/685; 361/679; 361/683; 361/684; 361/686
(58) Field of Search ................ 361/679, 683–686

(56) References Cited

U.S. PATENT DOCUMENTS 5,123,721 * 6/1992 Seo .......................................... 312/333
5,262,923 * 11/1993 Batta et al. ............................ 361/685

* cited by examiner

Primary Examiner—Leo P. Picard
Assistant Examiner—Yean-Hsi Chang
(74) Attorney, Agent, or Firm—Rosenberg, Klein & Lee

(57) ABSTRACT

A support for a data storage device having at least one slots provided on each side surface comprises two elongate plates provided on each of two opposite sides of the device having at least one latched members raised on an inner surface thereof such that each of the latched members being capable of inserting into a corresponding slot for securing the elongate plates and the device together wherein each of the latched members is disposed at an angle 45° with respect to each of the elongate plates. By utilizing this, an evenly distributed stress exerted on the latched members is made possible when supporting the device for effectively preventing the latched members from breaking.

1 Claim, 5 Drawing Sheets

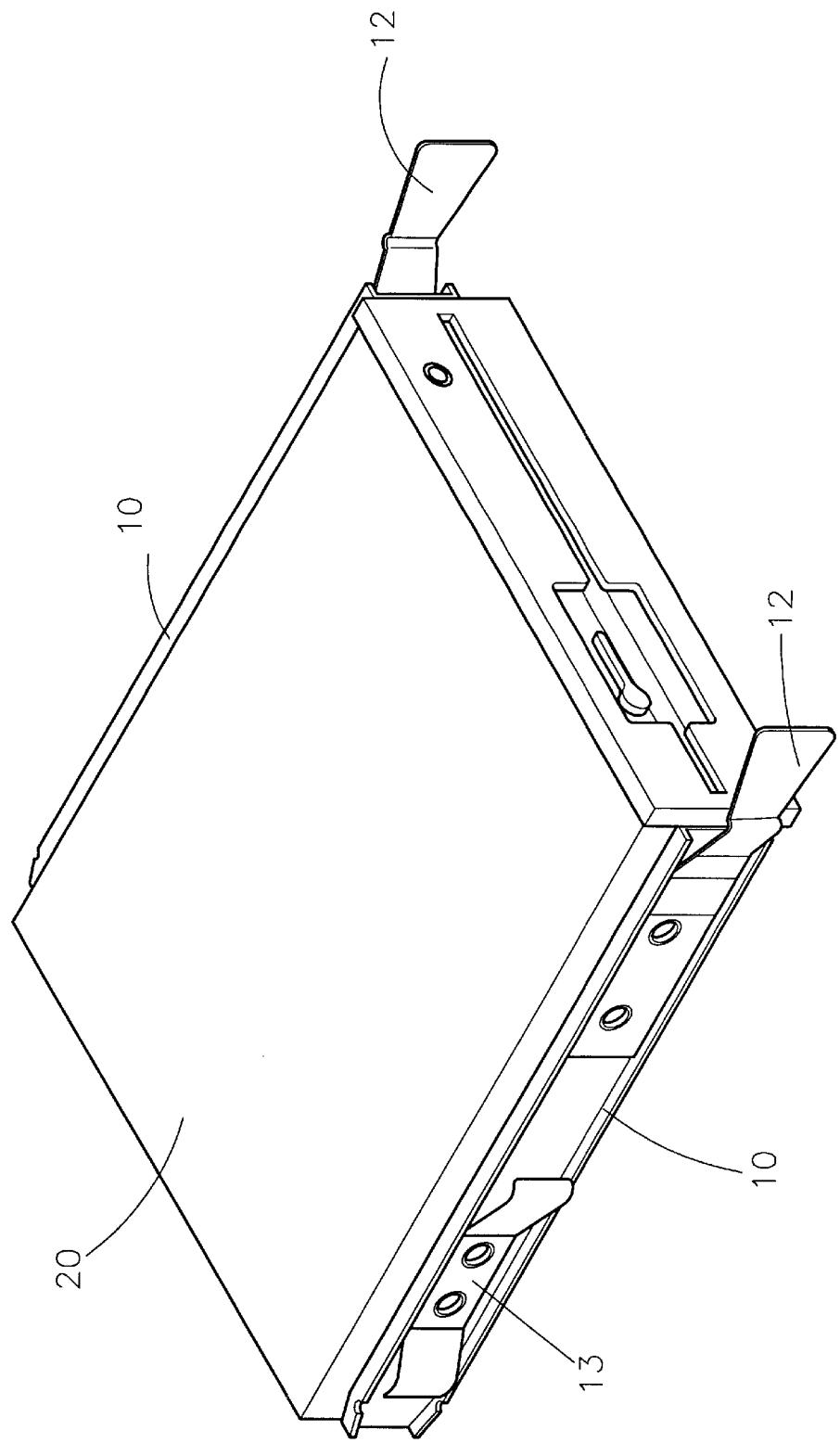

SUPPORT FOR A DATA STORAGE DEVICE

BACKGROUND OF THE INVENTION

1. Field of the Invention

The present invention relates to a support device and more particularly to a support for a data storage device having latched members for evenly distributing stress exerted thereon.

2. Description of Prior Art

A Taiwanese Pat. Publication No. 318,572 discloses a support for a data storage device as shown in FIG. 1 wherein two elongate plates used as brackets 10a are provided on each of two opposite sides of a data storage device 20a (e.g., a floppy disk). The bracket 10a has two tabs 11a spaced apart on the inner surface thereof. Correspondingly, the data storage device 20a has two slots 21a on each side surface for permitting the tabs 11a to insert into the slots 21a in order to secure brackets 10a and data storage device 20a together. The attached brackets 10a and data storage device 20a is capable of sliding into, for example, an internal frame of a computer (not shown) by the outer surfaces of brackets 10a and installed therewithin. But such a prior art is unsatisfactory because brackets 10a and tabs 11a are plastic material and manufactured by plastic ejection molding and thus an uneven stress distribution is possible when installed. In other words, the tabs 11a are susceptible to breakage. Further, plastic ejection molding involves a number of molding devices, resulting in a complex manufacturing process and an increase of manufacturing cost. In addition, an environmental pollution may be caused.

A Taiwanese Pat. Publication No. 210,776 discloses a support for a data storage device where in the elongate brackets are made of metal having a pair of latched members formed by punching on the brackets. The latched members are horizontally or vertically disposed on the inner surface of brackets. But such a prior art is still unsatisfactory because an uneven stress distribution is possible when installed. In other words, the latched members are susceptible to breakage due to nearly all stress are concentrated on the thin latched members.

A Taiwanese Pat. Publication No. 238,752 discloses a support for a data storage device wherein a plurality of threaded screws are employed to secure the elongate brackets to the side surfaces of data storage device. But such a prior art is still unsatisfactory because many screws are used, resulting in an increase of labor and accordingly cost.

Thus, it is desirable to provide a new and improved support for a data storage device in order to overcome the above drawbacks of prior art.

SUMMARY OF THE INVENTION

It is therefore an object of the present invention to provide a support for a data storage device having a plurality of latched members on a bracket wherein each of the latched members is disposed at an angle approximate 45° with respect to the bracket such that an evenly distributed stress exerted thereon is made possible when supporting the data storage device for effectively preventing the latched members from breaking.

It is another object of the present invention to provide a support for a data storage device wherein the elongate brackets and latched members are formed integrally by punching, thus providing a number of advantages such as simple molding device, lower cost, and without environmental pollution.

It is still another object of the present invention to provide a support for a data storage device wherein only a few screws are required to secure the elongate brackets to the side surfaces of data storage device, thereby greatly decreasing the amount of screws used and thus the assembly cost.

The above and other objects, features and advantages of the present invention will become apparent from the following detailed description taken with the accompanying drawings.

BRIEF DESCRIPTION OF THE DRAWINGS

FIG. 5 is a perspective view of FIG. 4.

DETAILED DESCRIPTION OF PREFERRED EMBODIMENTS

Figure 1:
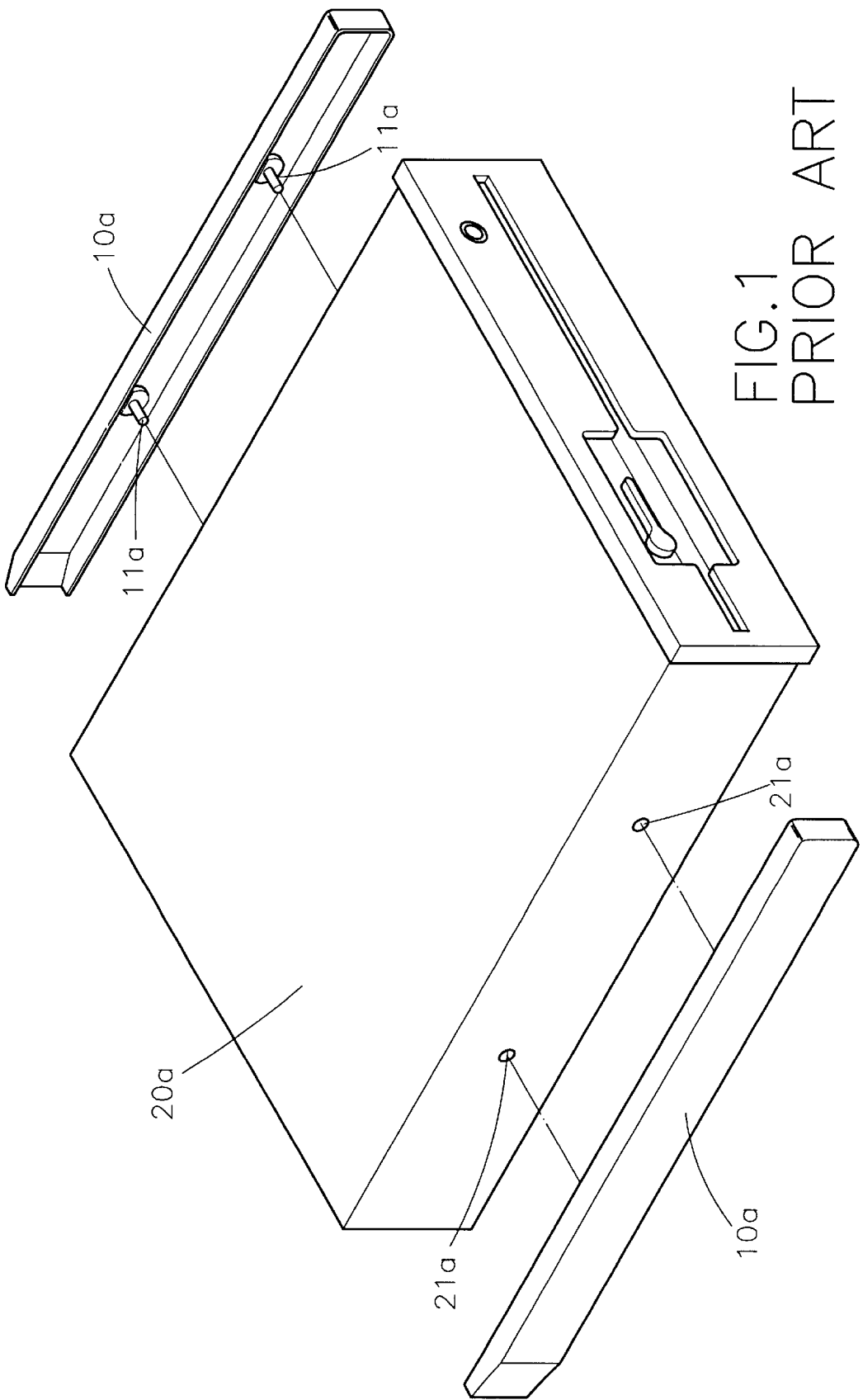
FIG. 1 is an exploded perspective view of a prior art support for a data storage device.
Figure 2:
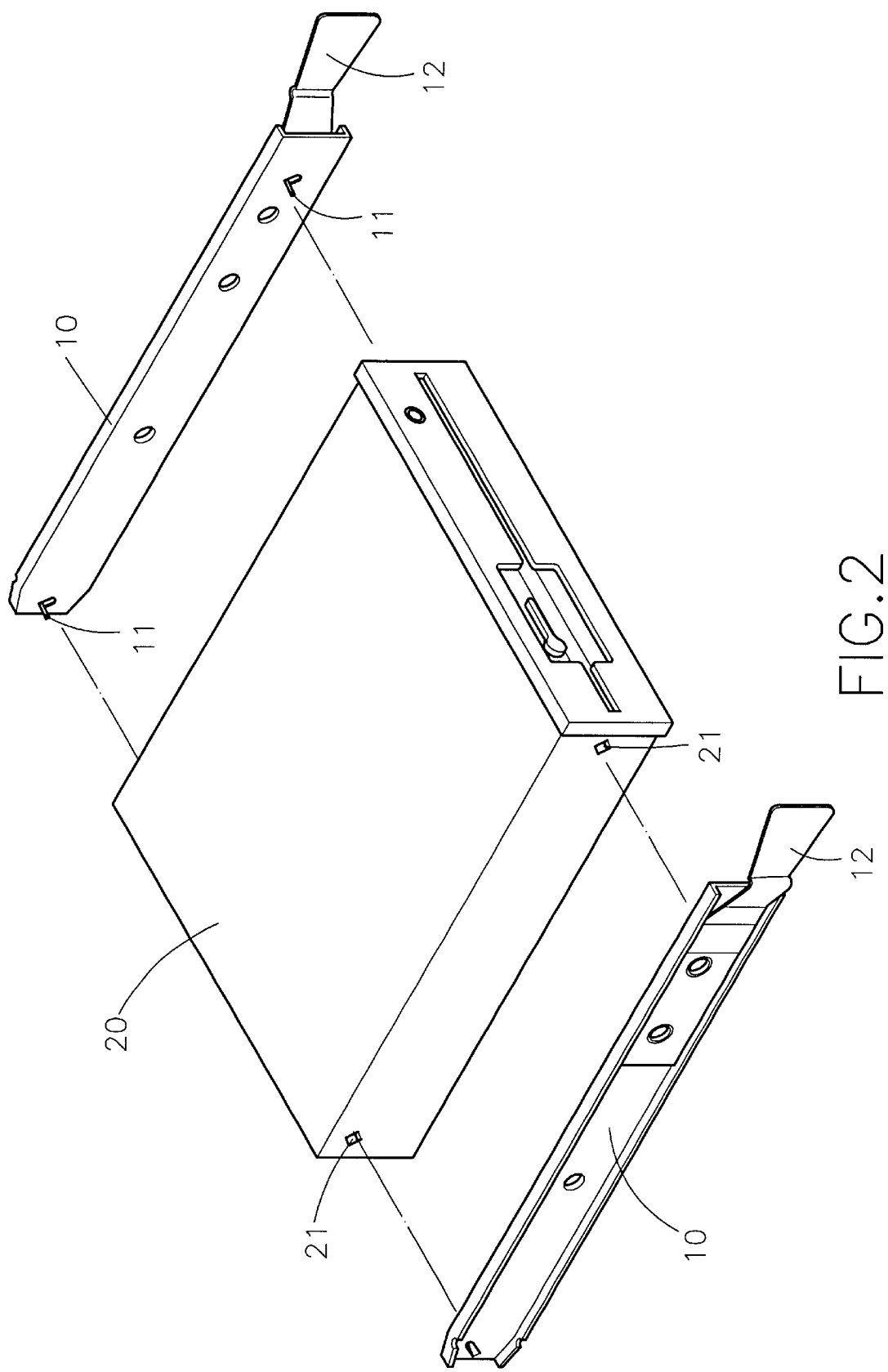
FIG. 2 is an exploded perspective view of a support for a data storage device according to a first preferred embodiment of the present invention.
Figure 3:
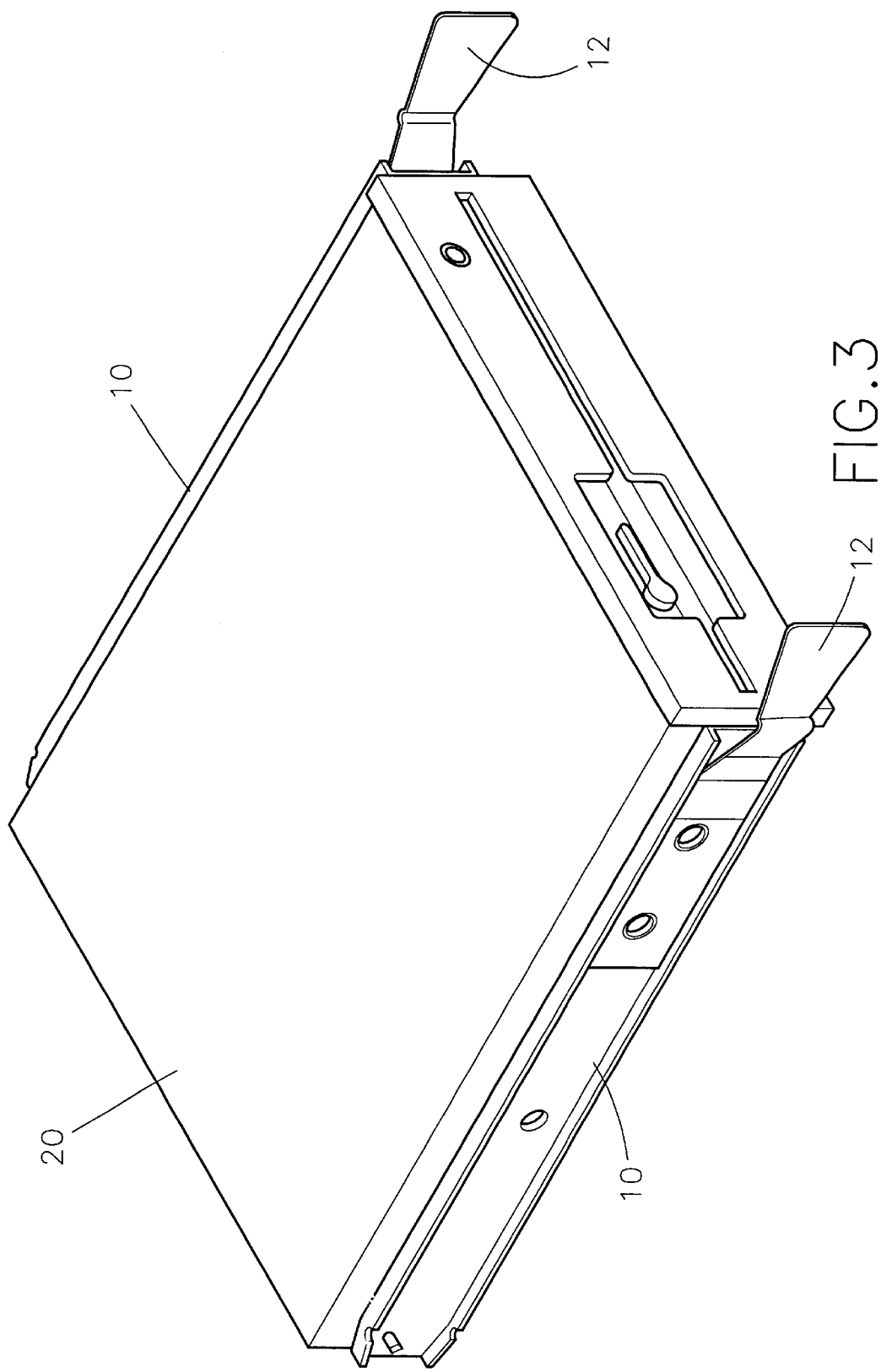
FIG. 3 is a perspective view of FIG. 2.

Referring to FIGS. 2–3, there is shown a support for a data storage device according to a first preferred embodiment of the present invention. Two elongate plates 10 used as brackets are provided on each of two opposite sides of a data storage device 20 (e.g., a floppy disk, hard disk, or a CD_ROM). The elongate brackets 10 are formed integrally by punching having a generally "[" shaped cross-section. The length of brackets 10 is generally the same as that of data storage device 20. A resilient short plate 12 is fixed to the internal side of each bracket 10 by a pair of rivets on an end having another end extended over the front of data storage device 20 a predetermined distance for facilitating user to grasp. A pair of latched members 11 are also formed by punching which are raised and spaced apart on the inner surface of the bracket 10. Correspondingly, the data storage device 20 has two slots 21a on each side surface for permitting the latched members 11 to insert into the slots 21 in order to secure brackets 10 and data storage device 20 together. The attached brackets 10 and data storage device 20 is capable of sliding into, for example, an internal frame of a computer (not shown) by the outer surfaces of brackets 10 and installed therewithin.

Figure 4:
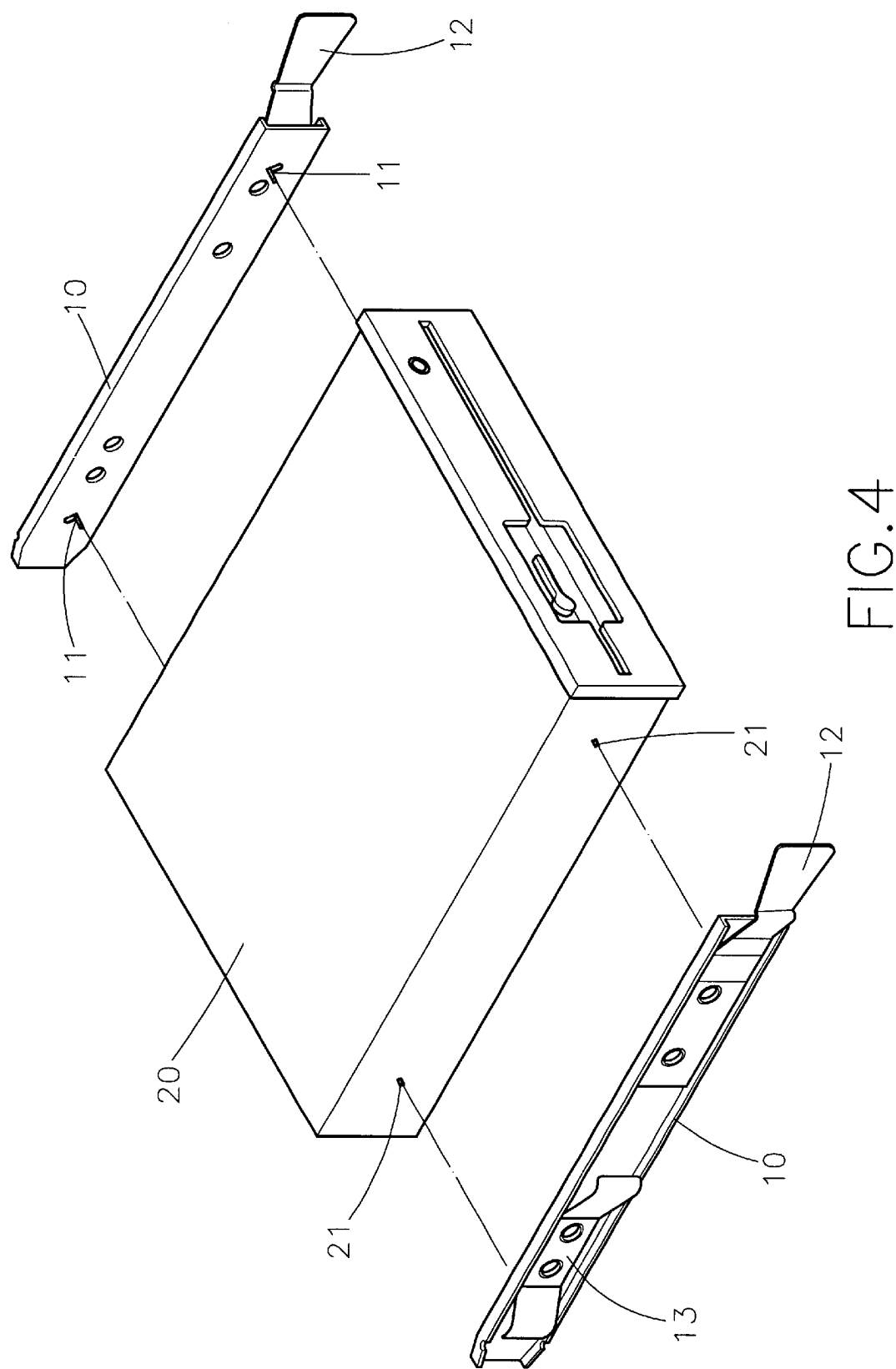
FIG. 4 is an exploded perspective view of a support for a data storage device according to a second preferred embodiment of the present invention.

Referring to FIGS. 4–5, there is shown a support for a data storage device according to a second preferred embodiment of the present invention. The only difference between the first and second preferred embodiments is the addition of a resilient member 13 fixed to the internal side of each bracket 10 by a pair of rivets. The resilient member 13 serves to provide a cushion between the data storage device 20 and the internal frame of computer when the attached brackets 10 and data storage device 20 are inserted into the computer. Additionally, a screw may be used to secure the data storage device 20 and bracket 10 together.

ADVANTAGES OVER THE PRIOR ART

Latched member 11 is disposed at an angle approximate 45° with respect to the bracket 10 such that an evenly distributed stress exerted thereon is made possible when supporting the data storage device 20 for effectively preventing the latched members 11 from breaking.

The elongate brackets 10 and latched members 11 are formed integrally by punching, thus realizing a simple molding device, lower cost, and without environmental pollution.

Since only a few screws are required to secure the elongate brackets 10 to the side surfaces of data storage device 20, thereby greatly decreasing the amount of screws used and thus the assembly cost.

While the invention herein disclosed has been described by means of specific embodiments, numerous modifications and variations could be made thereto by those skilled in the art without departing from the scope of the invention set forth in the claims.

What is claimed is:

1. A support for a data storage device having a pair of slots provided on each of two opposite side surface of the data storage device, said support comprising:

two elongate plates respectively coupled on each of the two opposite sides of the data storage device and extending in a longitudinal direction thereon, each of said elongate plates having a pair of longitudinally spaced latched members raised from an inner surface thereof, each of said latched members being inserted into a corresponding one of the slots of the data storage device for securing the elongate plates and the data storage device together, each of said latched members being disposed at an angle approximating 45° with respect to said longitudinal direction of said elongate plates for evenly distributing stresses thereon.

* * * * *